United States Patent
Hull et al.

(10) Patent No.: US 11,293,664 B2
(45) Date of Patent: Apr. 5, 2022

(54) DUAL TUBE SILENCER FOR SEPARATE GAS FLOWS

(71) Applicant: Gulfstream Aerospace Corporation, Savannah, GA (US)

(72) Inventors: Randy Hull, Savannah, GA (US); Andrew Gorton, Savannah, GA (US); Kristopher Lynch, Savannah, GA (US)

(73) Assignee: Gulfstream Aerospace Corporation

( * ) Notice: Subject to any disclaimer, the term of this patent is extended or adjusted under 35 U.S.C. 154(b) by 287 days.

(21) Appl. No.: 15/913,688

(22) Filed: Mar. 6, 2018

(65) Prior Publication Data
US 2019/0277535 A1 Sep. 12, 2019

(51) Int. Cl.
F24F 13/24 (2006.01)
B64D 13/06 (2006.01)
(Continued)

(52) U.S. Cl.
CPC .............. F24F 13/24 (2013.01); B64D 13/06 (2013.01); F24F 13/02 (2013.01); F24F 13/20 (2013.01);
(Continued)

(58) Field of Classification Search
CPC ................ F24F 13/24; F24F 2013/242; B64D 2013/0603; B64D 2013/064;
(Continued)

(56) References Cited

U.S. PATENT DOCUMENTS 2,573,474 A * 10/1951 Joseph .................... F01N 13/04
184/47
3,093,208 A * 6/1963 Howe ................. F01N 13/1838
181/245
(Continued)

FOREIGN PATENT DOCUMENTS

DE 1095504 B 12/1960
DE 102013101354 A1 * 8/2014 ............. B64D 13/06
(Continued)

OTHER PUBLICATIONS

"Machine Translation for JP2001213398A". 2021.*
"Machine Translation for DE102013101354A1". 2021.*

*Primary Examiner* — Edelmira Bosques
*Assistant Examiner* — Phillip Decker
(74) *Attorney, Agent, or Firm* — LKGlobal | Lorenz & Kopf, LLP

(57) ABSTRACT

Ventilation systems, aircraft, and silencers are disclosed herein. An aircraft includes a ventilation system. A ventilation system includes first and second air flow sources configured to generate first and second air flows, a silencer, a first conditioning vent, and a second conditioning vent. A divider spans an interior dimension of the housing to define a first cavity and a second cavity, where the divider restricts substantially all mass flow between the first cavity and the second cavity in the housing. First and second silencer tubes have porous portions disposed in the respective cavity and are operatively coupled with the respective air flow source to receive the respective air flow. First and second condi- (Continued)

tioning vents are operatively coupled with the respective silencer tubes to direct the respective air flows to a conditioned volume.

12 Claims, 3 Drawing Sheets

(51) Int. Cl.
    *G10K 11/16*     (2006.01)
    *F24F 13/20*     (2006.01)
    *F24F 13/02*     (2006.01)

(52) U.S. Cl.
    CPC .... *G10K 11/161* (2013.01); *B64D 2013/0603* (2013.01); *B64D 2013/064* (2013.01); *B64D 2013/0655* (2013.01); *F24F 2013/242* (2013.01)

(58) Field of Classification Search
    CPC .......... B64D 2013/0655; G10K 11/161; F01N 13/04; F01N 1/023; G64D 13/06
    USPC ............. 454/71, 72, 76, 906, 206, 262, 346; 181/275, 251, 224
    See application file for complete search history.

(56) References Cited

U.S. PATENT DOCUMENTS

| | | | |
|---|---|---|---|
| 4,236,597 A | | 12/1980 | Kiss et al. |
| 5,473,124 A | * | 12/1995 | Yazici ..................... F24F 13/24 181/224 |
| 5,545,084 A | * | 8/1996 | Fischer ................... B64D 13/08 454/76 |
| 5,869,792 A | * | 2/1999 | Allen ................... F16L 55/0333 181/224 |
| 5,890,957 A | * | 4/1999 | Scherer ................... B64D 13/08 454/76 |
| 6,802,388 B2 | * | 10/2004 | Wolf ......................... F01N 1/02 181/265 |
| 7,546,898 B2 | * | 6/2009 | Tracy ........................ G06F 1/16 181/224 |
| 7,874,401 B2 | | 1/2011 | Uhlemann et al. |
| 8,191,676 B2 | | 6/2012 | Havener et al. |
| 8,661,795 B2 | | 3/2014 | Eavenson, Sr. |
| 9,011,219 B2 | * | 4/2015 | Brunnberg ............. B64D 13/00 454/76 |
| 9,085,368 B2 | * | 7/2015 | Kelnhofer .............. B64D 13/08 |
| 9,540,111 B2 | * | 1/2017 | Dittmar .................. B64D 13/06 |
| 9,945,280 B2 | * | 4/2018 | Eichmueller ........... F01N 13/02 |
| 2003/0141413 A1 | | 7/2003 | Brasseur et al. |
| 2003/0173148 A1 | * | 9/2003 | Andersson ................ F01N 1/16 181/272 |
| 2018/0281975 A1 | * | 10/2018 | Carden ................... B64D 13/02 |
| 2019/0112052 A1 | * | 4/2019 | Bruno ..................... F01D 15/08 |

FOREIGN PATENT DOCUMENTS

| | | | | |
|---|---|---|---|---|
| EP | 2626644 A1 | | 8/2013 | |
| EP | 2642215 A1 | | 9/2013 | |
| GB | 621123 A | * | 4/1949 | ............ B64D 13/04 |
| GB | 1554915 A | | 10/1979 | |
| JP | 2001213398 A | * | 8/2001 | ............ B64D 13/06 |
| WO | WO-9620109 A1 | * | 7/1996 | ............ B08B 3/022 |

* cited by examiner

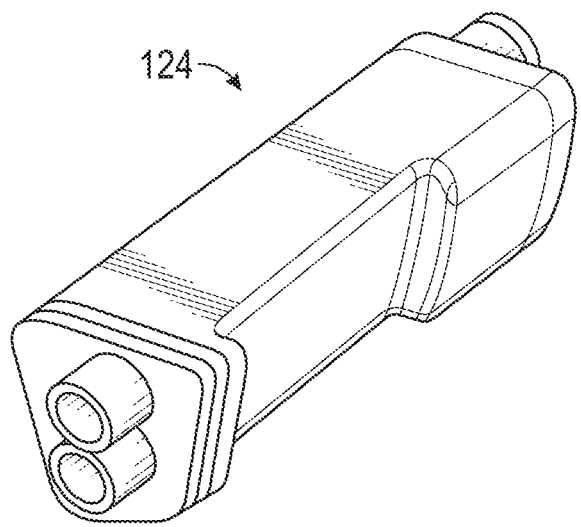 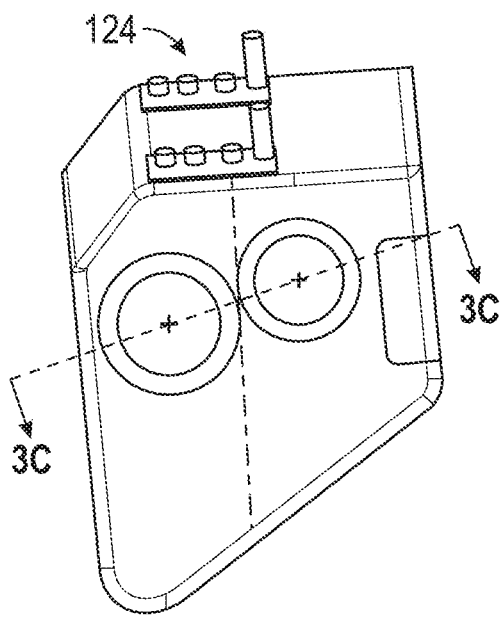
FIG. 3A  FIG. 3B
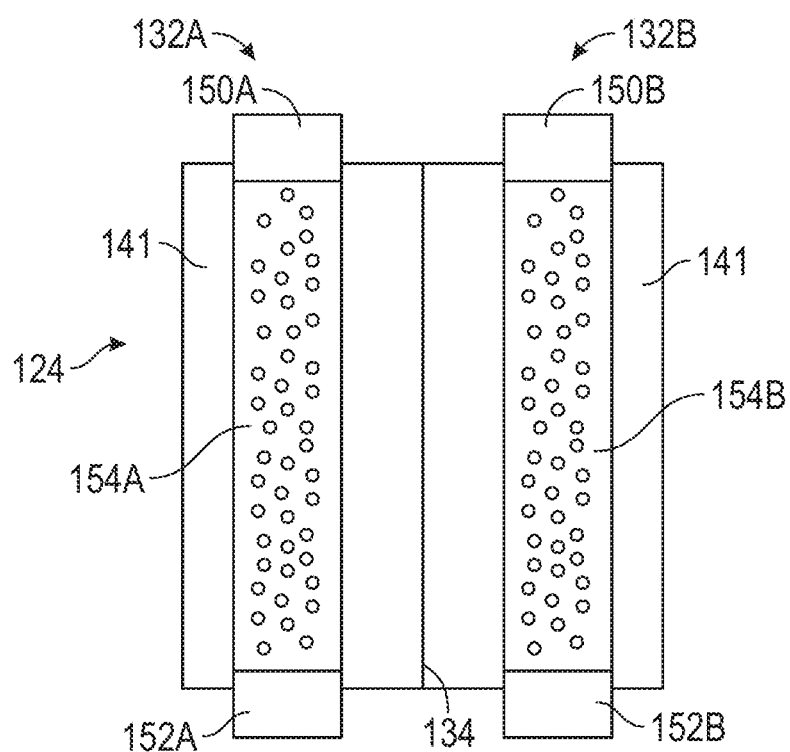
FIG. 3C

US 11,293,664 B2

DUAL TUBE SILENCER FOR SEPARATE GAS FLOWS

TECHNICAL FIELD

The present invention generally relates to aircraft ventilation system silencers that accommodate two separate gaseous flows, and more particularly relates to aircraft ventilation silencers with a single housing having a divider that separates the housing to restrict mass flow between two separate flows through the silencer.

BACKGROUND

A modern passenger aircraft commonly includes a ventilation system that is configured to direct the cooled or heated air into passenger occupied conditioned volumes onboard the aircraft. Typically, each passenger is presented with the ability to set and control the desired temperature of the compartment. For example, the cabin compartment can be divided into multiple climate controlled zones in which each passenger has the ability to set the desired temperature for comfort. As passenger cabins in aircraft become quieter, the noise transmitted and generated by such ventilation systems has become a significant source of disturbance to the passengers.

While the above described ventilation system is adequate, there is room for improvement. Accordingly, it is desirable to provide a ventilation system that provides ventilation system noise attenuation. Furthermore, other desirable features and characteristics will become apparent from the subsequent detailed description and the appended claims, taken in conjunction with the accompanying drawings and the foregoing technical field and background.

BRIEF SUMMARY

Ventilation systems, aircraft, and silencers are disclosed herein.

In a first non-limiting embodiment, a ventilation system includes, but is not limited to, a first air flow source configured to generate a first air flow, a second air flow source configured to generate a second air flow, a silencer, a first conditioning vent, and a second conditioning vent. The silencer includes a housing, a divider, a first silencer tube, and a second silencer tube. The divider spans an interior dimension of the housing to define a first cavity and a second cavity, where the divider restricts substantially all mass flow of the first air flow and the second air flow between the first cavity and the second cavity in the housing. The first silencer tube has a porous portion disposed in the first cavity and is operatively coupled with the first air flow source to receive the first air flow. The second silencer tube has a porous portion disposed in the second cavity and is operatively coupled with the second air flow source to receive the second air flow. The first conditioning vent is operatively coupled with the first silencer tube to direct the first air flow to a first portion of a conditioned volume. The second conditioning vent is operatively coupled with the second silencer tube to direct the second air flow to a second portion of the conditioned volume.

In a second non-limiting embodiment, an aircraft includes, but is not limited to, a fuselage, an Environmental Control System (ECS) source, a first upstream conduit, a second upstream conduit, a silencer, a first downstream conduit, a second downstream conduit, a first conditioning vent, and a second conditioning vent. The fuselage defines a conditioned volume having a first portion and a second portion. The ECS source is configured to generate a first air flow and a second air flow. The first upstream conduit is operatively coupled with the ECS source to receive the first air flow. The second upstream conduit is operatively coupled with the ECS source to receive the second air flow. The silencer includes a housing, a divider, a first silencer tube, and second silencer tube. The divider spans an interior dimension of the housing to define a first cavity and a second cavity, where the divider restricts substantially all mass flow between the first cavity and the second cavity in the housing. The first silencer tube has an output port, an input port operatively coupled with the first upstream conduit, and a porous portion disposed in the first cavity. The second silencer tube has an output port, an input port operatively coupled with the second upstream conduit, and a porous portion disposed in the second cavity. The first downstream conduit is operatively coupled with the output port of the first silencer tube. The second downstream conduit is operatively coupled with the output port of the second silencer tube. The first conditioning vent is operatively coupled with the first downstream conduit and is disposed in the first portion of the conditioned volume for conditioning the first portion of the conditioned volume. The second conditioning vent is operatively coupled with the second downstream conduit and is disposed in the second portion of the conditioned volume for conditioning the second portion of the conditioned volume.

In a third non-limiting embodiment, a silencer for a ventilation system includes, but is not limited to, a housing, a divider, a first silencer tube, and a second silencer tube. The divider spans an interior dimension of the housing to define a first cavity and a second cavity, where the divider restricts substantially all mass flow between the first cavity and the second cavity in the housing. The first silencer tube has a porous portion disposed in the first cavity and is configured to be operatively coupled with a first air flow source to receive a first air flow. The second silencer tube has a porous portion disposed in the second cavity and is configured to be operatively coupled with a second air flow source to receive a second air flow.

BRIEF DESCRIPTION OF THE DRAWINGS

The present invention will hereinafter be described in conjunction with the following drawing figures, wherein like numerals denote like elements.

FIG. 3A is a perspective view, FIG. 3B is a side view, and FIG. 3C is a cross section view of a dual tube silencer from the ventilation system of FIG. 2 in accordance with the teachings of the present disclosure.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A ventilation system with a dual tube silencer is described herein. The silencer has a single housing with a divider that defines two chambers of the housing and prevents mass flow between the chambers. Each chamber has an input and an output to attenuate noise in separate air flows through the separate chambers. The silencer described herein has advantageous weight, space, and part count features when compared with conventional silencers. A greater understanding of the ventilation system and silencer described above may be obtained through a review of the illustrations accompanying this application together with a review of the detailed description that follows.

Figure 1:
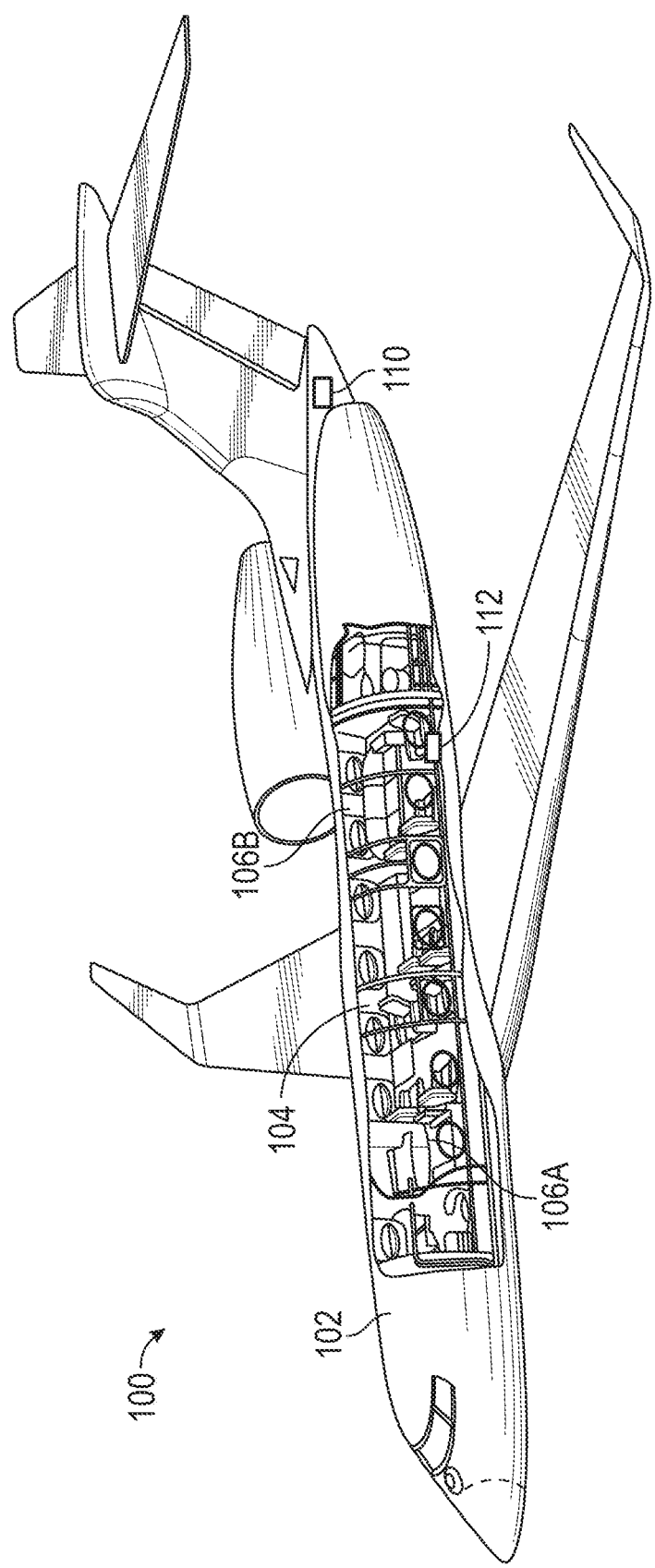
FIG. 1 is a perspective cutaway view illustrating an aircraft in accordance with the teachings of the present disclosure.

FIG. 1 is an environmental view illustrating an aircraft 100. Although the context of the discussion contained herein is with respect to a business jet, it should be understood that the teachings of the present disclosure are compatible with all types of aircraft including, but not limited to, private propeller driven aircraft, private jets, commercial jet passenger aircraft, commercial propeller driven passenger aircraft, cargo aircraft, military aircraft, and the like. Furthermore, although the ventilation system disclosed herein is described as being compatible for use on board an aircraft, it should be understood that the present ventilation system is compatible with all types of vehicles. For example, and without limitation, the ventilation system disclosed herein may be implemented on board automobiles, buses, trains, ships, spacecraft, and any other type of conveyance. Additionally, the ventilation system disclosed herein is not limited to implementation on vehicles, but may also be compatible for use in tents, houses, buildings, stadiums, theaters, and other permanent and/or semi-permanent structures.

Aircraft 100 includes a fuselage 102, a conditioned volume 104, an Environmental Control System (ECS) source 110, and a ventilation system 112. Fuselage 102 defines an exterior boundary of the aircraft and at least partially defines conditioned volume 104.

Figure 2:
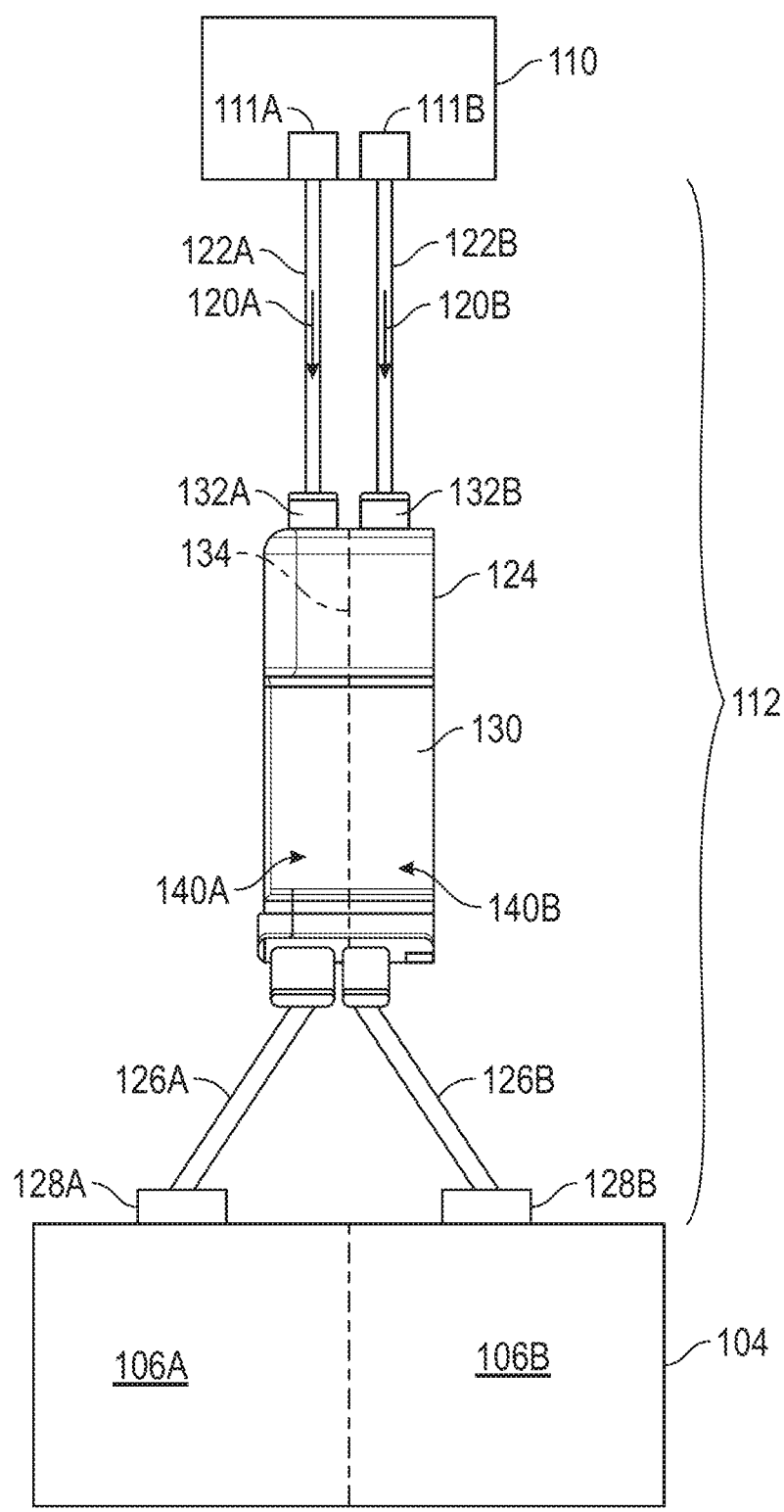
FIG. 2 is a simplified block diagram of a ventilation system from the aircraft of FIG. 1 according to the teaching of the present disclosure.

With continued reference to FIG. 1, FIG. 2 is a simplified block diagram illustrating a ventilation system 112 coupled with ECS source 110 and conditioned volume 104. Conditioned volume 104 is a habitable space conditioned by ECS source 110. For example, conditioned volume 104 may be a cabin compartment or a flight deck. In the example provided, conditioned volume 104 is a cabin compartment with a first portion 106A and a second portion 106B. Portions 106A-B may be separate rooms, may be different "zones" within the same room, or may be any other division of conditioned volume 104 into spaces that are separately serviced by ECS source 110 without departing from the scope of the present disclosure. For example, an occupant of first portion 106A may request an air flow having an air temperature that is different from an air temperature of an air flow requested by an occupant of second portion 106B.

ECS source 110 includes a first air flow source 111A and a second air flow source 111B. First air flow source 111A is configured to generate a first air flow 120A and second air flow source 111B is configured to generate a second air flow 120B that may have different characteristics. For example, ECS source 110 may include an air conditioner and/or a heater and air flow sources 111A-B may be separate fans and/or valves for providing cooled or heated air at the same or at different flow rates and temperatures for first air flow 120A and second air flow 120B.

It should be appreciated that any gaseous substance may be provided as first and second flows without departing from the scope of the present disclosure. As used herein, the term "air" refers to any gas or gaseous mixture intended for conventional inhalation by occupants of conditioned volume 104. For example, the air of air flows 120A-B may have an oxygen concentration or other molecular concentration that is higher or lower than the oxygen concentration or other molecular concentration of air at sea level.

Ventilation system 112 includes a first upstream conduit 122A, a second upstream conduit 122B, a silencer 124, a first downstream conduit 126A, a second downstream conduit 126B, a first conditioning vent 128A, and a second conditioning vent 128B. First upstream conduit 122A is operatively coupled with ECS source 110 to receive first air flow 120A and second upstream conduit 122B is operatively coupled with ECS source 110 to receive second air flow 120B. As used herein, the term "operatively coupled" may be by direct physical coupling or may be by indirect coupling by intermediate components that direct at least part of the air flow to the operatively coupled component.

Referring now to FIGS. 3A-C, and with continued reference to FIG. 2, silencer 124 is illustrated in various views in accordance with the teachings of the present disclosure. In the example provided, silencer 124 is hidden from view and is located near a downstream end of ventilation system 112. Silencer 124 includes a housing 130, a first silencer tube 132A, a second silencer tube 132B, and a divider 134. Housing 130 and divider 134 define a first chamber or first cavity 140A and a second chamber or second cavity 140B. Divider 134 spans an interior dimension of housing 130 and restricts substantially all mass flow between first cavity 140A and second cavity 140B in housing 130. As used herein, restricting substantially all mass flow means that divider 134 is designed to prevent mass flow between cavities 140A-B, but may permit some incidental mass flow due to manufacturing tolerance gaps or the like.

In the example provided, housing 130 and divider 134 are formed from composite materials. In some embodiments, divider 134 is a metal baffle. Cavities 140A-B are filled with acoustic deadening or acoustically absorptive materials 141 to attenuate noise in the air flows. It should be appreciated that the presence and/or type of absorptive materials may vary without departing from the scope of the present disclosure.

Divider 134 is a solid pressure boundary that restricts crossflow between cavities 140A-B. A position of divider 134 inside housing 130 is configured to optimize a first cabin noise profile at first portion 106A and a second cabin noise profile at second portion 106B of conditioned volume 104. The position of divider 134 is configured to optimize noise profiles based on a noise input at input port 150A and 150B of first silencer tube 132A and second silencer tube 132B. In the example provided, the position is fixed at the time of manufacture and does not change during operation.

The noise going into each cavity is known based on characteristics of ECS source 110 and flow characteristics through upstream conduits 122A-B. Higher noise sources and faster air flows require larger differences between a surface area of the interior of the upstream conduit and the surface area of the cavity. For example, where a velocity of second air flow 120B is greater than a velocity of first air flow 120A with similar noise from ECS source 110, a difference in surface area between second upstream conduit 122B and second cavity 140B may be greater than a difference in surface area between first upstream conduit 122A and first cavity 140A. In the example provided, first upstream conduit 122A has a diameter of 2.5 inches, second upstream conduit 122B has a diameter of 2.0 inches, a noise input has large magnitudes at 100-10,000 Hz frequencies, and divider 134 is positioned perpendicular to a wall of housing 130 to define a first cavity 140A with a volume of 361 cubic inches and a second cavity 140B with a volume of 328 cubic inches. It should be appreciated that the dimensions of any given implementation may vary without departing from the scope of the present disclosure.

In the example provided, divider 134 is substantially perpendicular to a wall of housing 130 at an intersection between divider 134 and housing 130. In some embodiments, divider 134 is slanted or skewed within housing 130 to increase a surface area within each of cavities 140A-B.

First silencer tube 132A has an input port 150A operatively coupled with first upstream conduit 122A, an output port 152A operatively coupled with first downstream conduit 126A, and a porous portion 154A disposed in first cavity 140A. Second silencer tube 132B has an input port 150B operatively coupled with second upstream conduit 122B, an output port 152B operatively coupled with second downstream conduit 126B, and a porous portion 154B disposed in second cavity 140B. Input ports 150A-B guide air flows 120A-B from upstream conduits 122A-B to porous portions 154A-B. Output ports 152A-B guide air flows 120A-B from porous portions 154A-B to downstream conduits 126A-B.

Porous portions 154A-B expose the acoustic energy of air flows 120A-B to the acoustic deadening material while the gas flows through silencer tubes 132A-B. Porous portions 154A-B may be a perforated metal, a porous weave, or have any other configuration that permits acoustic energy to pass between an inside and an outside of porous portions 154A-B.

In the example provided, first downstream conduit 126A is substantially the same size as first upstream conduit 122A and second downstream conduit 126B is substantially the same size as second upstream conduit 122B. In some embodiments, the upstream and downstream conduits have different sizes. For example, the downstream conduit may be larger than the upstream conduit to slow the air flow as it enters conditioned volume 104. In some embodiments, downstream conduits 126A-B may include distribution manifolds that split each of air flows 120A-B into separate air flows for distribution by multiple vents at several locations in each of portions 106A-B of conditioned volume 104.

First conditioning vent 128A is operatively coupled with first downstream conduit 126A and is disposed in first portion 106A of conditioned volume 104 for conditioning first portion 106A. Second conditioning vent 128B is operatively coupled with second downstream conduit 126B and is disposed in second portion 106B of conditioned volume 104. In the example provided, conditioning vents 128A-B are cabin distribution vents. Other types of vents may be utilized without departing from the scope of the present disclosure.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the disclosure as set forth in the appended claims.

What is claimed is:

1. A ventilation system, comprising:
   a first air flow source configured to generate a first air flow to service a first portion of a conditioned volume;
   a second air flow source configured to generate a second air flow that is separate from the first air flow to service a second portion of the conditioned;
   a silencer comprising:
      a housing;
      a divider spanning an interior dimension of the housing to define a first cavity and a second cavity, wherein the divider restricts substantially all mass flow of the first air flow and the second air flow between the first cavity and the second cavity in the housing;
      a first silencer tube having a porous portion disposed in the first cavity, wherein the first silencer tube is operatively coupled with the first air flow source to receive the first air flow;
      a second silencer tube having a porous portion disposed in the second cavity, wherein the second silencer tube is operatively coupled with the second air flow source to receive the second air flow;
      acoustic deadening material disposed in the first cavity surrounding the first silencer tube, wherein the porous portion of the first silencer tube exposes acoustic energy of the first air flow to the acoustic deadening material in the first cavity to attenuate noise; and
      acoustic deadening material disposed in the second cavity surrounding the second silencer tube, wherein the porous portion of the second silencer tube exposes acoustic energy of the second air flow to the acoustic deadening material in the second cavity to attenuate noise;
      a first conditioning vent operatively coupled with the first silencer tube to direct the first air flow to the first portion of the conditioned volume; and
      a second conditioning vent operatively coupled with the second silencer tube to direct the second air flow to the second portion of the conditioned volume,
      wherein a position of the divider within the housing is based on a noise input at the first silencer tube and the second silencer tube.

2. The ventilation system of claim 1, wherein the first air flow source and the second air flow source are components of an Environmental Control System (ECS) source for an aircraft, the first conditioning vent is a first cabin distribution for the aircraft, and the second conditioning vent is a second cabin distribution for the aircraft.

3. The ventilation system of claim 1, further comprising a first upstream conduit and a second upstream conduit, wherein the first upstream conduit is operatively coupled with the first air flow source to direct the first air flow to the first silencer tube, and wherein the second upstream conduit is operatively coupled to the second air flow source to direct the second air flow to the second silencer tube.

4. The ventilation system of claim 1, further comprising a first downstream conduit and a second downstream conduit, wherein the first downstream conduit is operatively coupled between the first silencer tube and the first conditioning vent and the second downstream conduit is operatively coupled between the second silencer tube and the second conditioning vent.

5. The ventilation system of claim 4, wherein the first downstream conduit is substantially the same diameter as a first upstream conduit and the second downstream conduit is substantially the same diameter as a second upstream conduit.

6. The ventilation system of claim 1, wherein the housing and the divider are formed from composite materials.

7. The ventilation system of claim 1, wherein the divider is a metal baffle.

8. An aircraft, comprising:
a fuselage defining a conditioned volume having a first portion and a second portion;
an Environmental Control System (ECS) source configured to generate a first air flow and a second air flow separate from the first air flow to separately service the first portion and the second portion of the conditioned volume;
a first upstream conduit operatively coupled with the ECS source to receive the first air flow;
a second upstream conduit operatively coupled with the ECS source to receive the second air flow;
a silencer comprising:
   a housing;
   a divider spanning an interior dimension of the housing to define a first cavity and a second cavity, wherein the divider restricts substantially all mass flow between the first cavity and the second cavity in the housing;
   a first silencer tube with an output port, an input port operatively coupled with the first upstream conduit, and a porous portion disposed in the first cavity;
   a second silencer tube with an output port, an input port operatively coupled with the second upstream conduit, and a porous portion disposed in the second cavity;
   acoustic deadening material disposed in the first cavity surrounding the first silencer tube, wherein the porous portion of the first silencer tube exposes acoustic energy of the first air flow to the acoustic deadening material in the first cavity to attenuate noise; and
   acoustic deadening material disposed in the second cavity surrounding the second silencer tube, wherein the porous portion of the second silencer tube exposes acoustic energy of the second air flow to the acoustic deadening material in the second cavity to attenuate noise;
a first downstream conduit operatively coupled with the output port of the first silencer tube;
a second downstream conduit operatively coupled with the output port of the second silencer tube;
a first conditioning vent operatively coupled with the first downstream conduit and disposed in the first portion of the conditioned volume for conditioning the first portion of the conditioned volume; and
a second conditioning vent operatively coupled with the second downstream conduit and disposed in the second portion of the conditioned volume for conditioning the second portion of the conditioned volume, and
wherein the divider is positioned based on a first noise profile at the first conditioning vent and on a second noise profile at the second conditioning vent.

9. The aircraft of claim 8, wherein the position of the divider is positioned further based on a noise input at the input port of the first silencer tube and the second silencer tube.

10. The aircraft of claim 8, wherein the housing and the divider are formed from composite materials.

11. The aircraft of claim 8, wherein the divider is a metal baffle.

12. The aircraft of claim 8, wherein the first downstream conduit is substantially the same diameter as the first upstream conduit and the second downstream conduit is substantially the same diameter as the second upstream conduit.

* * * * *